(12) United States Patent
Mascarenas et al.

(10) Patent No.: US 11,096,843 B2
(45) Date of Patent: Aug. 24, 2021

(54) VEHICLE WHEELCHAIR LIFT

(71) Applicant: Ford Global Technologies, LLC, Dearborn, MI (US)

(72) Inventors: Emily Mascarenas, Bloomfield Hills, MI (US); David Johnston, Royal Oak, MI (US); Philip Bigos, Farmington Hills, MI (US); Michael Antonio Ciavaglia, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/603,898

(22) PCT Filed: Apr. 19, 2017

(86) PCT No.: PCT/US2017/028310
§ 371 (c)(1),
(2) Date: Oct. 9, 2019

(87) PCT Pub. No.: WO2018/194577
PCT Pub. Date: Oct. 25, 2018

(65) Prior Publication Data
US 2020/0113753 A1    Apr. 16, 2020

(51) Int. Cl.
*A61G 3/02*   (2006.01)
*A61G 3/06*   (2006.01)
(Continued)

(52) U.S. Cl.
CPC .......... *A61G 3/0209* (2013.01); *A61G 3/062* (2013.01); *A61G 3/0808* (2013.01); *B62D 25/20* (2013.01)

(58) Field of Classification Search
CPC .......... B60P 1/486; B60P 1/54; A61G 3/0209; A61G 3/0808; A61G 3/062; B62D 25/20;
(Continued)

(56) References Cited

U.S. PATENT DOCUMENTS 3,656,637 A * 4/1972 Lynn ..................... B60R 5/00
                                                    414/542
4,249,853 A * 2/1981 Lyvers ................ B60P 1/5419
                                                    212/230
(Continued)

FOREIGN PATENT DOCUMENTS

DE    102011103382 A1    12/2012
GB         2322352 A     8/1998
JP        2000210335 A   8/2000

OTHER PUBLICATIONS

International Search Report and Written Opinion dated Jun. 30, 2017 regarding International Application No. PCT/US2017/028310 (11 pages).

*Primary Examiner* — Glenn F Myers
(74) *Attorney, Agent, or Firm* — Brandon Hicks; Bejin Bieneman PLC

(57) ABSTRACT

A wheelchair lift includes a base, and an arm slideably supported by the base. A chair support is rotatably supported by the arm. A linkage is supported by the arm and is extendable relative to the chair support from a coiled position to a straightened position. A motor is supported by the arm and is connected to the linkage. The linkage is coiled about the motor in the coiled position.

20 Claims, 13 Drawing Sheets

(51) Int. Cl.
*A61G 3/08* (2006.01)
*B62D 25/20* (2006.01)

(58) Field of Classification Search
CPC ... B25J 11/009; B25J 15/0028; B25J 15/0253
USPC ........ 414/563, 494, 506, 509, 542, 543, 561
See application file for complete search history.

(56) References Cited

U.S. PATENT DOCUMENTS

| | | | | |
|---|---|---|---|---|
| 4,281,958 A | * | 8/1981 | Molski | A61G 3/0209 |
| | | | | 414/462 |
| 4,544,321 A | * | 10/1985 | Lanier | A61G 3/0209 |
| | | | | 212/350 |
| 4,639,182 A | * | 1/1987 | Inaba | B60P 1/5447 |
| | | | | 212/231 |
| 4,750,132 A | * | 6/1988 | Pessina | B65G 61/00 |
| | | | | 212/286 |
| 5,062,760 A | * | 11/1991 | Samaniego | B66C 17/00 |
| | | | | 414/542 |
| 5,746,563 A | | 5/1998 | Steckler | |
| 5,846,047 A | * | 12/1998 | Riekki | B60P 3/122 |
| | | | | 414/494 |
| 6,698,994 B2 | * | 3/2004 | Barrett | B60P 3/07 |
| | | | | 414/462 |
| 6,817,825 B1 | * | 11/2004 | O'Hagen | B60P 1/28 |
| | | | | 414/477 |
| 7,402,019 B2 | | 7/2008 | Alexander | |
| 8,998,257 B2 | | 4/2015 | Hebel | |
| 9,815,205 B2 | * | 11/2017 | Piccioni | B25J 11/0025 |
| 2006/0045686 A1 | | 3/2006 | Alexander | |
| 2007/0189885 A1 | | 8/2007 | Madormo et al. | |
| 2011/0076121 A1 | * | 3/2011 | Gaghis | A61G 3/0808 |
| | | | | 414/471 |
| 2012/0275891 A1 | | 11/2012 | Pace et al. | |

* cited by examiner

US 11,096,843 B2

VEHICLE WHEELCHAIR LIFT

BACKGROUND

An operator of a vehicle may use a wheelchair. When operating the vehicle, the operator may stow the wheelchair in the vehicle. For example, the operator may fold the wheelchair and stow the wheelchair on an adjacent vehicle seat. In another example, the operator may stow the wheelchair on a vehicle floor in a vehicle cabin. However, stowing the wheelchair may be cumbersome. There remains an opportunity to design a system for assisting storage of the wheelchair in the vehicle.

DETAILED DESCRIPTION

Figure 1:
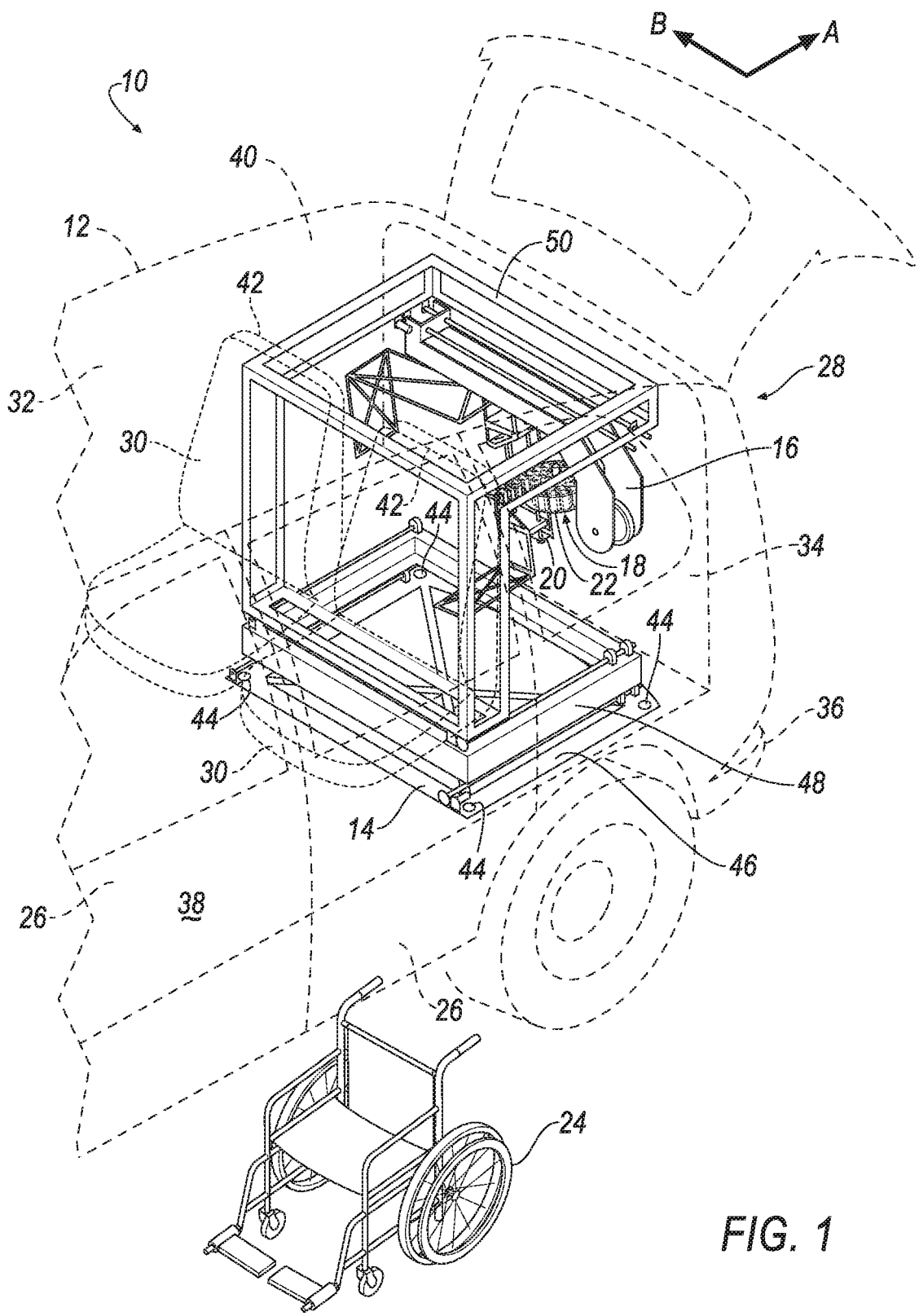
FIG. 1 is a perspective view of a wheelchair lift of a vehicle in a stowed position.

A wheelchair lift includes a base and an arm slideably supported by the base. The wheelchair lift further includes a chair support rotatably supported by the arm. The wheelchair lift further includes a linkage supported by the arm. The linkage is extendable relative to the chair support from a coiled position to a straightened position. The wheelchair lift further includes a motor supported by the arm and connected to the linkage. The linkage is coiled about the motor in the coiled position.

The linkage may include a proximity sensor. The arm may be designed to stop extension of the linkage upon detection of an object with the proximity sensor.

The linkage may extend substantially flat in the straightened position.

The chair support may a holder, a finger, and a second motor. The finger may be movable toward the holder with the second motor from an open position to a closed position. The linkage may be connected to the holder. The finger may be designed to engage a wheelchair.

The base may include a first frame and a second frame movably connected to the first frame. The arm may be supported by the second frame. The base may include a third frame movably connected to the second frame. The arm may be supported by the third frame.

The chair support may be positioned to grab a wheelchair. The arm may include an arm motor designed to rotate the grabber and the wheelchair about an axis defined by the arm motor.

The base may be translatable along a first direction. The arm may be translatable along a second direction transverse to the first direction.

A vehicle includes a body extending along a longitudinal axis, The body defines an opening. A vehicle floor is supported by the body. A base is fixed to the vehicle floor. An arm is supported by the base. The arm is movable out of the opening. A chair support is supported by the base. A linkage is supported by the arm. The linkage is extendable relative to the chair support from a coiled position to a straightened position. A motor is supported by the arm. The motor is connected to the linkage. The linkage is coiled about the motor in the coiled position.

The vehicle may further include a seat. The base may be movable to a stowed position below a top of the seat.

The linkage may include a proximity sensor. The arm may be designed to stop movement of the linkage from the coiled position to the straightened position upon detection of an object with the proximity sensor.

The chair support may be positioned to engage a wheelchair. The arm may include an arm motor. The arm motor may be designed to rotate the chair support and the wheelchair about the longitudinal axis.

The vehicle may further include a door attached to the body. A wheelchair may be spaced from the door and the body. The chair support may be positioned to grab the wheelchair and to move the wheelchair into the body through the opening.

The chair support may include a holder, a finger, and a second motor. The finger may be movable toward the holder with the second motor from an open position to a closed position. The linkage may be connected to the holder. The finger may be designed to engage a wheelchair.

The base may include a first frame and a second frame. The second frame may be movably connected to the first frame. The second frame may be translatable along the longitudinal axis. The arm may be translatable along a cross-vehicle axis transverse to the longitudinal axis.

A system includes a computer programmed to, upon receiving a user input, move an arm out from a rear compartment of a vehicle. The computer is programmed to actuate a motor on the arm to extend a linkage toward a vehicle door to a straightened position. The computer is programmed to actuate the motor to retract the linkage away from the vehicle door to a coiled position.

The computer may be programmed to, upon extending the linkage to the straightened position, actuate a grabber motor to move a finger toward a holder to grab a wheelchair.

The computer may be programmed to, upon extending the linkage to the straightened position, actuate a grabber motor to move a finger away from a holder to release a wheelchair.

With reference to the Figures, wherein like numerals indicate like parts throughout the several views, a wheelchair lift 10 in a vehicle 12 includes a base 14, an arm 16 slideably supported by the base 14, a chair support 18 rotatably supported by the arm 16, a linkage 20 supported by the arm 16, and a motor 22 supported by the arm 16 and connected to the linkage 20. The linkage 20 is extendable relative to the chair support 18 from a coiled position to a straightened position. The linkage 20 is coiled about the motor 22 in the coiled position.

By using the linkage 20 to move a wheelchair 24 into the vehicle 12, the wheelchair lift 10 can move the wheelchair 24 from a door 26, e.g., a front driver-side door, to a rear compartment 28, allowing an operator to stow the wheelchair 24 from the driver-side seat 30. Thus, the wheelchair lift 10 can stow the wheelchair 24 while the operator stays in the driver-side seat 30.

The vehicle 12 may be any suitable type of vehicle 12, e.g., an automobile, including a sedan, a pick-up truck, a sport-utility vehicle, etc. The vehicle 12 may be an autonomous vehicle 12. For example, the vehicle 12 may have a computer that may control the operations of the vehicle 12 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 12 includes a body 32, as shown in FIGS. 1-8. The body 32 may extend along a longitudinal axis A. The body 32 may define a cross-vehicle axis B perpendicular to the longitudinal axis A. The body 32 may define a rear end 36 and a front end (not shown) of the vehicle 12. The body 32 may have a unibody construction, i.e., a unitary-body construction. In the unibody construction, the body 32 is unitary, i.e., a continuous one-piece unit. As another example not shown in the Figures, the body 32 and a frame of the vehicle 12 may have a body-on-frame construction (also referred to as a cab-on-frame construction). In other words, the body 32 and frame are separate components, i.e., are modular, and the body 32 is supported on and affixed to the frame. Alternatively, the body 32 and frame may have any suitable construction. The body 32 and/or the frame may be formed of any suitable material, for example, steel, aluminum, etc.

The vehicle 12 includes a left side and a right side spaced from each other along the cross-vehicle axis B. The left side and the right side may each include at least one door 26, e.g., a front driver-side door as shown in the Figures. Common numerals are used to identify common features of the left side and the right side. The left side and the right side may be mirror images of each other about the longitudinal axis A of the vehicle 12, or at least may include several features that are mirror images about the longitudinal axis A.

The body 32 defines an opening 34, as shown in FIGS. 1-8, e.g., a lift-gate opening, a hatch opening, a trunk opening, etc. The vehicle 12 structure may assist with the ingress and/or egress of the wheelchair 24 through the opening 34 because the opening 34 extends continuously across the rear end 36 of the vehicle. The opening 34 may provide access to a rear compartment 28 of the vehicle 12, e.g., rear compartment 28, a rear cargo area, a hatch, a trunk etc. The rear compartment 28 may be part of the vehicle cabin 40. The vehicle may include a closure, e.g., a lift-gate, hatch lid, deck lid, etc., for allowing access to the rear compartment 28.

As set forth above, the door 26 is supported by the body 32 of the vehicle 12. Specifically, the vehicle 12 includes a plurality of doors 26 supported by the body 32. Both the right side and the left side of the vehicle 12 may include doors 26. The vehicle 12, alternatively, may have any suitable number of doors 26. Common numerals are used to identify common features of the doors 26.

The doors 26 are movable relative to the body 32 between a closed position and an open position. Each door 26 may be movable between the open and closed positions independently of each other. In other words, any one of the doors 26 may be open or closed regardless of the position of other doors 26. When the doors 26 are in the closed position, the doors 26 retain occupants in the vehicle 12. When the doors 26 are in the open position, the doors 26 allow occupant ingress and egress.

The doors 26 may be hinged to the body 32. In other words, a hinge (not numbered) may be between each door 26 and the body 32. The doors 26 may be hinged to forward pillars, central pillars, or rearward pillars (not shown).

The vehicle 12 includes the vehicle floor 38 in the vehicle cabin 40. The vehicle floor 38 may support the vehicle occupants in the vehicle cabin 40. As shown in FIGS. 1-8, the base 14 may be fixed to the vehicle floor 38. The vehicle floor 38 may present a class-A surface to the vehicle cabin 40.

The vehicle 12 may include a plurality of seats 30, as shown in FIGS. 1-8. The seats 30 may support occupants in the vehicle cabin 40. The wheelchair lift 10 may be disposed behind the seats 30 in the stowed position. The seats 30 may each include a top 42, and the wheelchair lift 10 may be disposed below the tops 42 of the seats 30. Common numerals are used to identify common features of the seats 30.

The body 32 may define the vehicle rear compartment 28, as shown in FIGS. 1-8. The vehicle rear compartment 28 may be a portion of the vehicle cabin 40 between the rear end 36 of the vehicle 12 and the vehicle seats 30. The portion of the vehicle floor 38 in the vehicle rear compartment 28 may include one or more attachment points 44. The base 14 of the wheelchair lift 10 may be fixed to the attachment points 44. The attachment points 44 may include any suitable attachment mechanisms, e.g., turnbuckles, threaded fasteners, etc.

When the occupant enters the vehicle cabin 40 through one of the doors 26, e.g., the driver-side door 26, the wheelchair 24 may be spaced from the door 26 and the body 32 of the vehicle 12. The wheelchair lift 10 may move the wheelchair 24 through the opening 34 into the vehicle rear compartment 28. When the base 14 of the wheelchair lift 10 is in the stowed position, the wheelchair 24 is disposed below the top of the seat 30.

Figure 2:
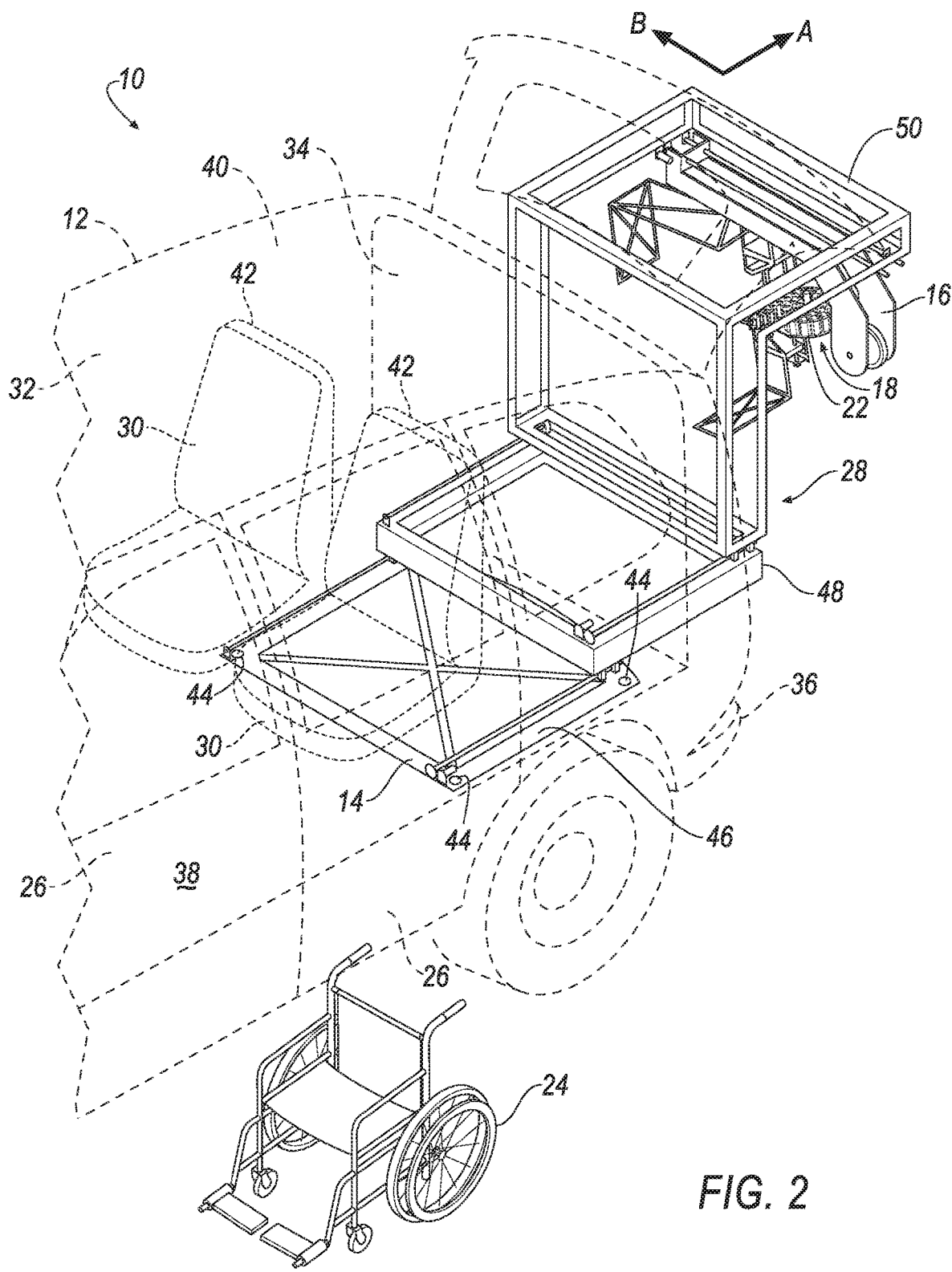
FIG. 2 is a perspective view of the wheelchair lift moving to a deployed position.

The wheelchair lift 10 includes the base 14. The base 14 is fixed to the vehicle floor 38, e.g., with the attachment points 44. The base 14 is moveable between a stowed position, as shown in FIG. 1, in which the base 14 is entirely contained within the rear compartment 28, and a deployed position, as shown in FIG. 2, in which the base 14 partially extends from the rear compartment 28. The base 14 includes a plurality of frames 46, 48, 50. As shown in FIGS. 1-8, the base includes a first frame 46, a second frame 48, and a third frame 50. The first frame 46 of the base 14 may be fixed to the vehicle floor 38, and the second frame 48 may be movable relative to the first frame 46 from a stowed position, as shown in FIG. 1, to a deployed position, as shown in FIG. 2. The third frame 50 may be movably connected to the second frame 48. The second frame 48 and the third frame 50 may each be movable from a stowed position, as shown in FIG. 1, to a deployed position, as shown in FIG. 2. When the second frame 48 and the third frame 50 are each in the deployed position, the base 14 is in the deployed position.

The wheelchair lift 10 includes the arm 16, as shown in FIGS. 1-8. The arm 16 is slideably supported by the base 14. The arm 14 may be supported by the third frame 50, as shown in FIGS. 1-8. Alternatively, the arm 14 may be supported by the second frame 48. As described above, the frames 46, 48, 50 of the base 14 may be translatable relative to each other along a first direction and the arm 16 may be translatable along a second direction transverse to the first direction. Specifically, the second frame 48 may be translatable along the longitudinal axis A, and the arm 16 may be translatable across the cross-vehicle axis B transverse to the longitudinal axis A.

Figure 8:
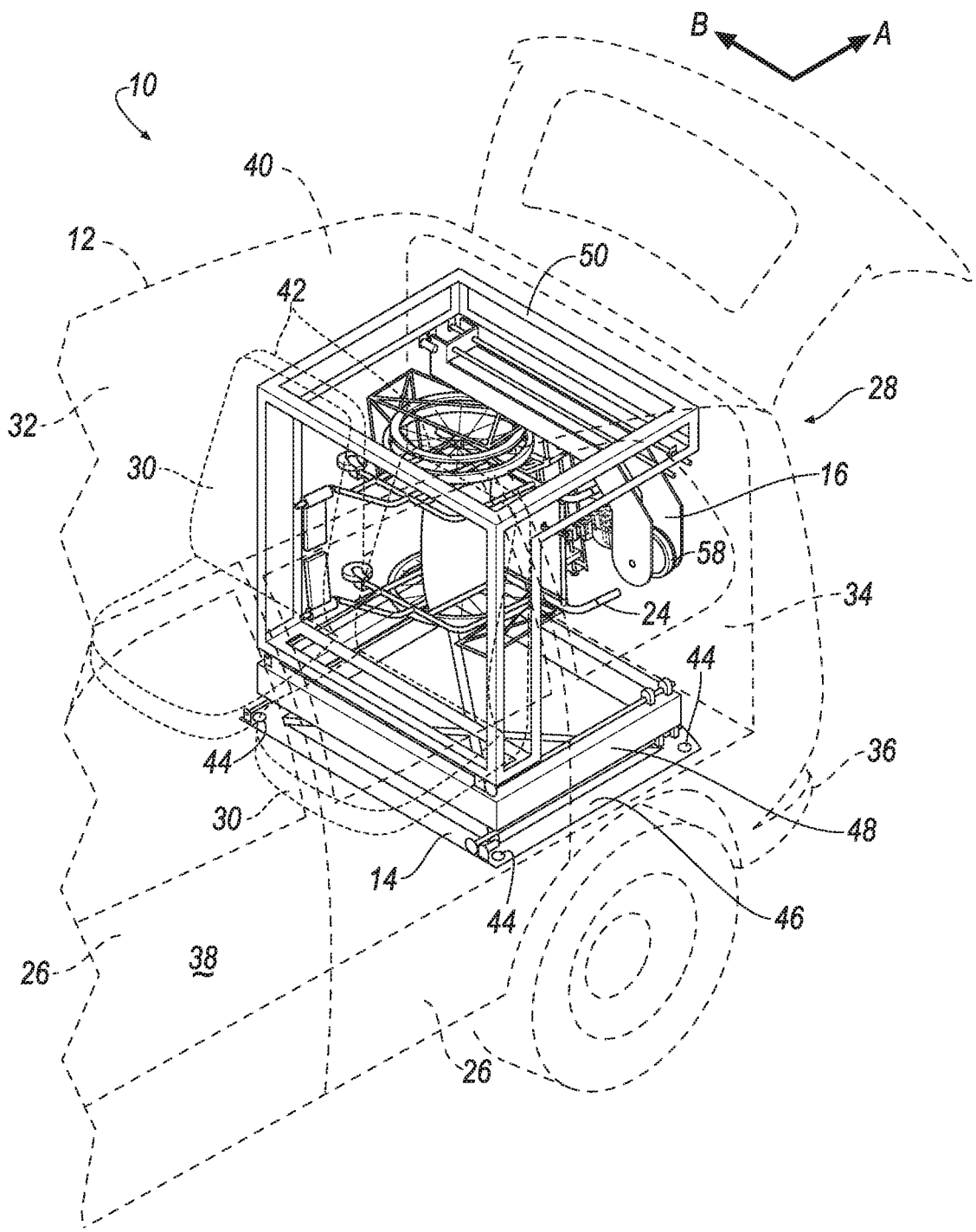
FIG. 8 is a perspective view of the wheelchair lift in the stowed position with the wheelchair.

The wheelchair lift 10 may be disposed below the tops 42 of the seats 30 in the stowed position, allowing the operator of the vehicle 12 to view out of the vehicle rear compartment 28, e.g., through a rear window. As shown in FIGS. 1 and 8, the wheelchair lift 10 may be stowed in the vehicle rear compartment 28 in the stowed position. The base 14 may be sized so that the upper surface of the base 14 is spaced below the tops 42 of the seats 30 closest to the wheelchair lift 10, preventing the wheelchair lift 10 from blocking a view of the operator out of the rear end 36 of the vehicle 12.

The wheelchair lift 10 includes the motor 22, as shown in FIGS. 1-9. The motor 22 is supported by the arm 16. The motor 22 may include a motor shaft 52 rotatable about a motor axis C. As shown in FIGS. 1-3B and 5-9, the linkage 20 may be coiled about the motor shaft 52 in the coiled position.

The wheelchair lift 10 includes the chair support 18, as shown in FIGS. 1-8. The chair support 18 includes a support base 54 and a chair holder 56. The chair support 18 is rotatably supported by the arm 16 by an arm motor 58. The chair support 18 may be attached to an arm motor shaft 60, and the arm motor 58 may rotate the chair support 18 from a stowed position, as shown in FIG. 2, to a deployed position, as shown in FIG. 3A. The chair support 18 may be positioned to grab the wheelchair 24 and to move the wheelchair 24 into the cabin 40 through the opening 34.

The chair support 18 may include the support base 54, as shown in FIGS. 1-8. The support base 54 may support the chair holder 56, as shown in FIG. 3B. The support base 54 may be rotatably attached to the arm motor 58. That is, the arm motor 58 may rotate the support base 18 about an arm motor axis D, moving the chair support 18 from a stowed position to a deployed position.

The support base 18 may include a mount 62, as shown in FIGS. 1-8. The mount 62 may support the wheelchair 24, as shown in FIGS. 5-8. The mount 62 may include a first portion 62a and a second portion 62b, as shown in FIG. 3B. The first portion 62a may be fixed to the support base 18. The second portion 62b may be movably attached to the support base 18. The mount 62 may support the wheelchair 24.

Figure 9:
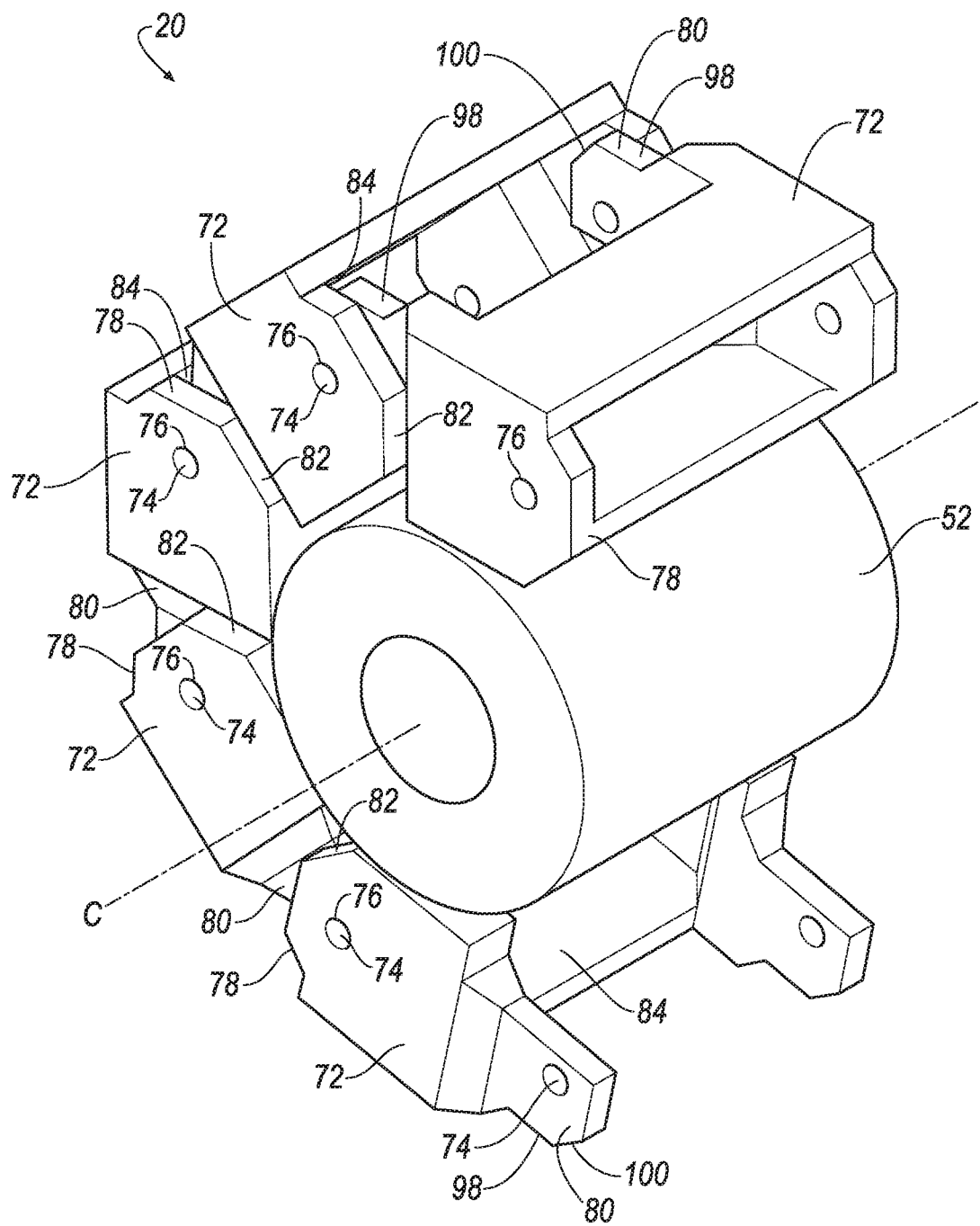
FIG. 9 is a view of the linkage in a coiled position.

The chair support 18 includes the motor 22, as shown in FIGS. 1-8. The motor 22 may be fixed to the support base 54. The motor 22 may extend the linkage 20 from the coiled position to the straightened position. The motor 22 may include the motor shaft 52 and the linkage 20 may be coiled about the motor shaft 52, as shown in FIG. 9. One of the links 72 of the linkage 20 may be fixed to the motor shaft 52. Upon actuation of the motor 22, the motor 22 may rotate the motor shaft 52, deploying the linkage 20 to the straightened position. Specifically, the motor 22 pushes the links 72 of the linkage 20 toward the straightened position as the motor shaft 52 is rotated. Similarly, the motor pulls the links 72 of the linkage 20 toward the coiled position as the motor shaft 52 is rotated in an opposite direction.

The chair support 18 includes a grabber 64 attached to the linkage 20, as shown in FIGS. 1-8. The grabber 64 includes a holder 66, a finger 68, and a grabber motor 70, as shown in FIG. 3B. The finger 68 is movable toward the holder 66 from an open position to a closed position. The grabber motor 70 may move the finger 68 between the open position and the closed position.

Figure 4:
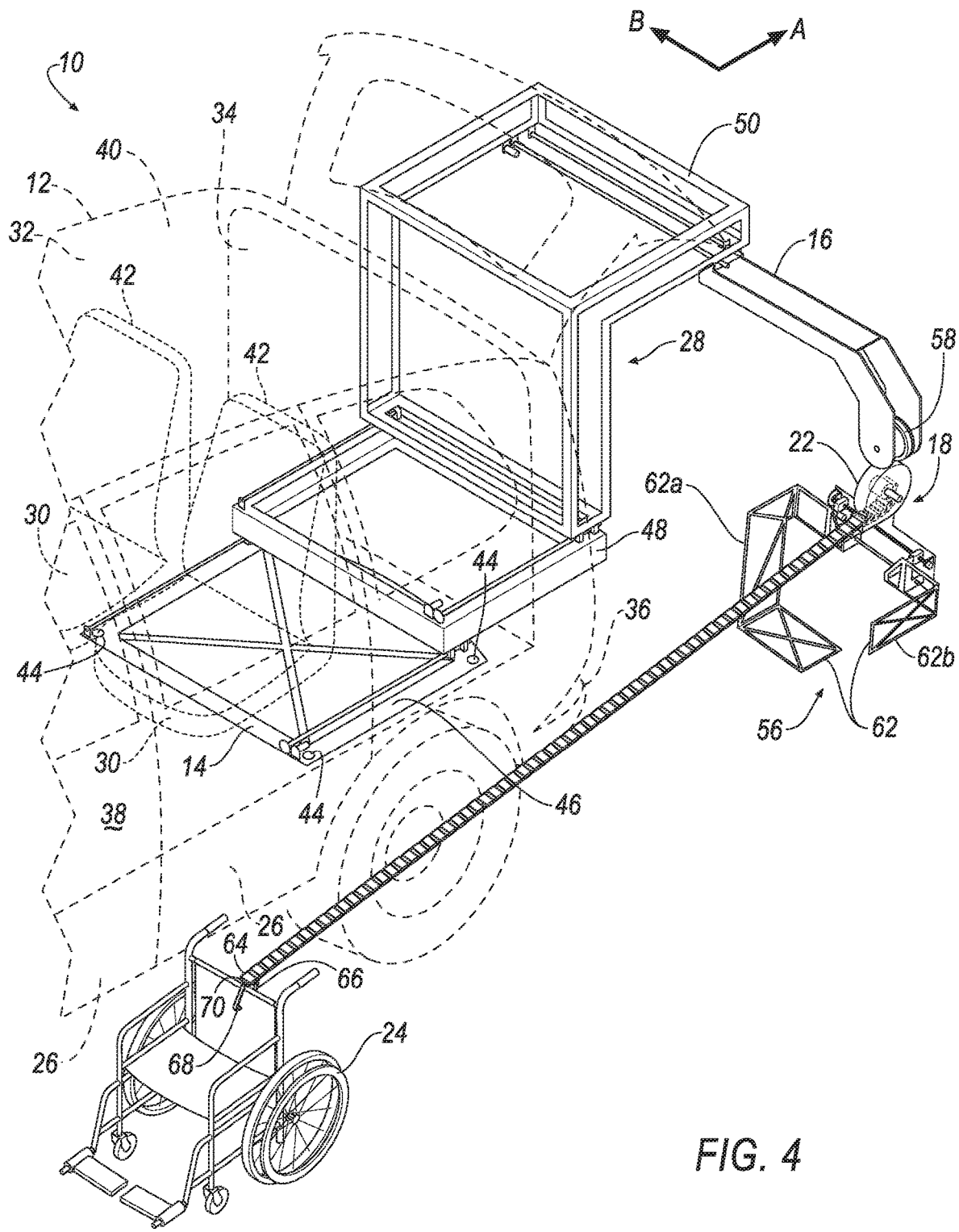
FIG. 4 is a perspective view of a linkage attached to the arm extending to a straightened position.

The chair support 18 may be positioned to grab the wheelchair 24. That is, as shown in FIG. 4, the motor 22 may extend the linkage 20 to the wheelchair 24 and the grabber motor 70 may move the finger 68 to the closed position. When the finger 68 is in the closed position, the wheelchair 24 may be fixed between the finger 68 and the holder 66, securing the wheelchair 24. The motor 22 may then retract the linkage 20, moving the wheelchair 24 toward the chair support 18. When the linkage 20 moves the wheelchair 24 into the mount 62, the arm motor 58 may rotate the chair support 18, including the grabber 64 and the wheelchair 24, about the arm motor axis D. The arm motor axis D may be parallel to the vehicle longitudinal axis A.

Figure 10:
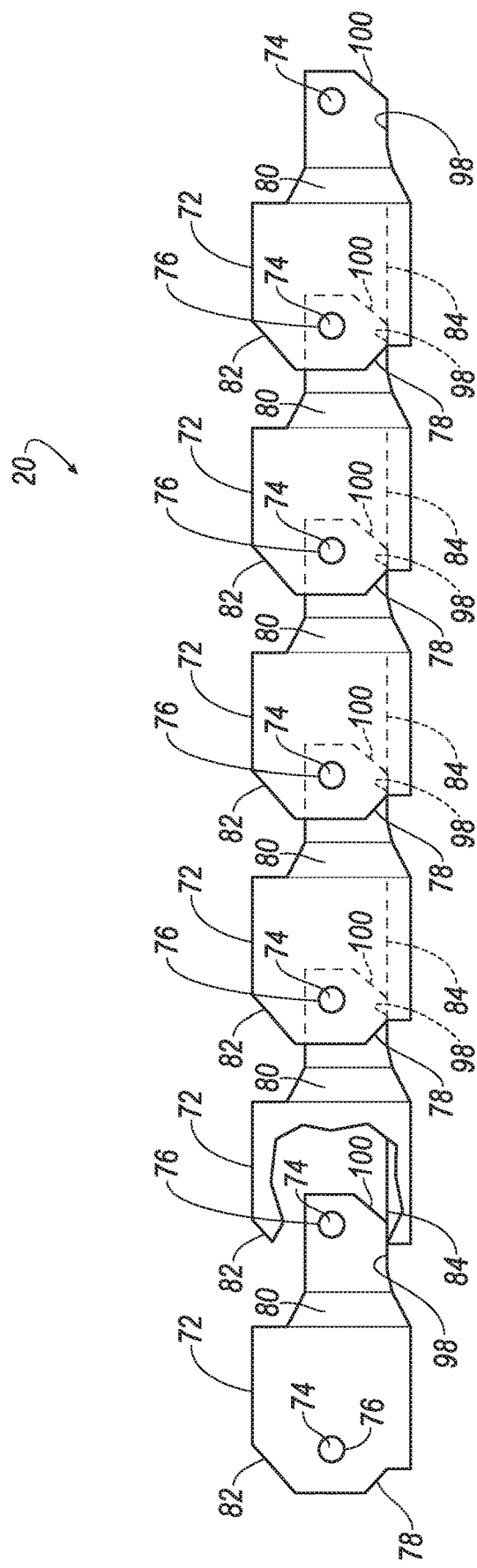
FIG. 10 is a view of the linkage in the straightened position.

The wheelchair lift 24 includes the linkage 20. As shown in FIGS. 4, 9, and 10, the linkage 20 is movable from the coiled position to the straightened position. The linkage 20 may include a plurality of links 72 attached to each other. Each link 72 may include a shaft 74 that can receive a slot 76 from another link 72. Adjacent links 72 may rotate relative to each other about the shaft 74. Each link 72 may have a rotating end 78 and a hinge end 80. The slot 76 may be disposed at the rotating end 78. The shaft 74 may be disposed at the hinge end 80.

Each link 72 may include an angled upper surface 82 and a lower surface 84 at the rotating end 78. Each link may further include a reacting surface 98 and an angled lower surface 100 at the hinge end 80. The angled upper surface 82 of one of the links 72 may rotate toward the hinge end 80 of the previous link 72, as shown in FIG. 9, and the lower surface 84 of the link 72 may rotate past the angled lower surface 100 and engage the reacting surface 98 of the previous link 72, as shown in FIG. 10. Thus, when the linkage 20 is in the coiled position, as shown in FIG. 9, each angled upper surface 82 is disposed past the hinge end 80 of the previous link 72, coiling the linkage 20. When the linkage 20 is in the straightened position, the links 72 rotate to move the lower surface 84 past the angled lower surface 100 and to abut the lower surface 84 with the reacting surface 98 of an adjacent link 72. The abutment of the adjacent lower surfaces 84 and the reacting surfaces 98 is substantially flat. That is, the linkage 20 may extend substantially flat in the straightened position.

Figure 11:
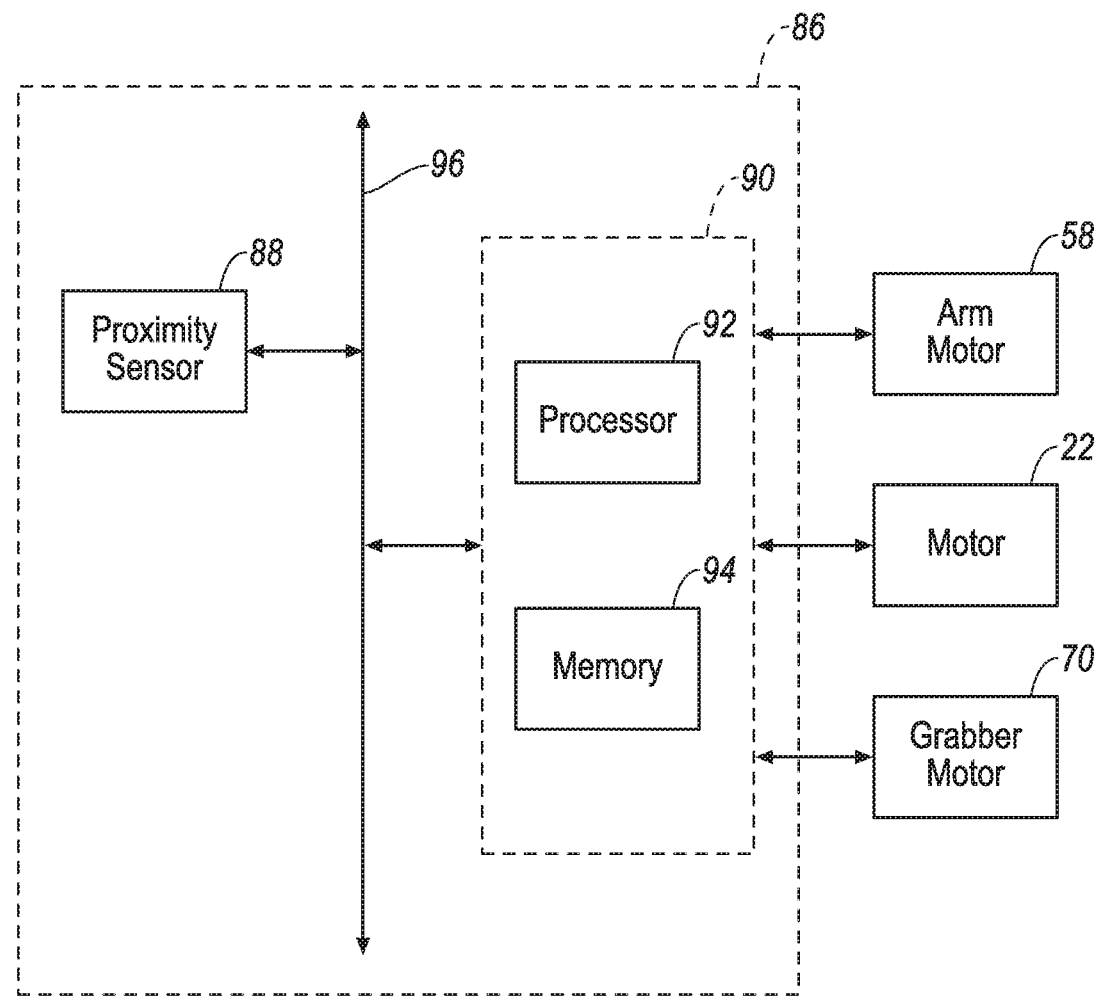
FIG. 11 is a block diagram of an object detection system.

As shown in FIG. 11, the wheelchair lift 10 may include an object detecting system 86. The object detecting system 86 may include a proximity sensor 88 and a controller 90. The controller 90 is in communication with the motor 22, the arm motor 58, and the grabber motor 70. The controller 90 is a computer and includes a processor 92 and a memory 94. The memory 94 stores instructions executable by the processor 92 to control the motor 22, the arm motor 58, and the grabber motor 70. The controller 90 may be programmed to, upon detecting that the grabber 64 is within a distance threshold of the wheelchair 24, cause the motor 22 to stop payout of the linkage 20 and the actuate the grabber motor 70 to move the finger 68 to the closed position.

The proximity sensor 88 may be fixed to an end of the linkage 20. The controller 90 may be configured to stop extension of the linkage 20 upon detection of an object with the proximity sensor 88. That is, when the proximity sensor 88 detects an object (e.g., the wheelchair 24), the proximity sensor 88 may communicate with the controller 90. The controller 90 may then instruct the motor 22 to stop extension of the linkage 20 and may instruct the grabber motor 64 to move the finger 68 to the closed position.

The proximity sensor 88 may be in communication with the controller 90 to communicate data to the controller 90. The proximity sensor 88 may use e.g., accelerometers, radar, lidar, and/or a vision system. The vision system may include one or more cameras, CCD image sensors, and/or CMOS image sensors, etc. Based on data communicated by the proximity sensor 88, the controller 90 may cause triggering of the motor 22.

To facilitate communications, the controller 90, the proximity sensor 88, the motor 22, and other components in the vehicle 12 may be connected to a communication bus 96, such as a controller area network (CAN) bus, of the vehicle 12. The controller 90 may use information from the communication bus 96 to control the triggering of the motor 22. The motor 22 may be connected to the controller 90 or may be connected to the communication bus 96.

The operator of the vehicle 12 may operate the wheelchair lift 10 to move the wheelchair 24 into the rear compartment 28 of the vehicle 12. The operator may provide an input to an input mechanism, e.g., a push button, an icon on a vehicle human-machine interface (HMI) a software program on a user portable device, etc., that sends a message over the communications bus 96 to the controller 90. The HMI may be a device that receives user input, e.g., a touchscreen in an instrument panel in the vehicle 12, a smartphone, a tablet, a portable computer, a key fob, etc. The push button may be disposed on, e.g., an exterior of one of the vehicle doors 26, an interior of one of the vehicle doors, an instrument panel, a control cluster, one of the seats 30, etc. The controller 90 may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems.

Upon receiving the input, the controller 90 may be programmed to grab the wheelchair 24. The controller 90 may be programmed to instruct the closure via the communications bus 96 to open, exposing the rear compartment 28. The controller 90 may be programmed to actuate the frames 48, 50 to move out of the rear compartment 28 through the opening 34.

The controller 90 is programmed to actuate the arm motor 58 to move the arm 16 out from the rear compartment 28 to the deployed position. When the arm 16 is in the deployed position, the controller 90 is programmed to actuate the motor 22 to move the linkage 20 toward one of the vehicle doors 26 to the straightened position. The controller 90 may be programmed to actuate the grabber motor 70 to move the finger 68 toward the holder 66 to grab the wheelchair 24. The controller 90 may be further programmed to actuate the grabber motor 70 to move the finger 68 away from the holder 66 to release the wheelchair 24. Upon grabbing the wheelchair 24, the controller 90 is programmed to actuate the motor 22 to retract the linkage 20 away from the vehicle door 26 to the coiled position. When the linkage 20 is in the coiled position, the wheelchair 24 may be supported by the mount 62.

The controller 90 may be programmed to, upon receipt of the wheelchair 24, actuate the arm motor 58 to move the arm to the stowed position and the actuate the frames 48, 50 to move into the opening 34 and to the stowed position in the rear compartment 28. Thus, the operator may provide an input to move the wheelchair 24 from a position spaced from a door 26 (e.g., a driver-side door) to the rear compartment 28. When the wheelchair 24 is in the wheelchair lift 10 in the stowed position, the operator may provide an input to move the wheelchair 24 from the rear compartment 28 to a position outside of the vehicle 12, e.g., spaced from one of the doors 26.

The user in the wheelchair 24 may open one of the vehicle doors 26 (e.g., a driver-side door) and sit in the seat 30 closest to the vehicle door 26, leaving the wheelchair 24. The user may provide input to the input mechanism. The arm 16 may extend out from the rear compartment 28 to the deployed position, and the motor 22 may extend the linkage 20 to grab the wheelchair 24. The motor 22 may retract the linkage 20 to move the wheelchair 24 to the arm 16, and the arm 16 may move the wheelchair 24 into the rear compartment 28. Thus, the user may stow the wheelchair 24 when entering the vehicle 12.

When the user desires to leave the vehicle 12, the user may provide an input to the input mechanism. The arm 16 with the wheelchair 24 may extend out from the rear compartment 28, and the motor 22 may extend the linkage 20 to deliver the wheelchair 24 to the user at the vehicle door 26. The motor 22 may retract the linkage 20 and the arm 16 may move to the stowed position in the rear compartment 28. Thus, the user may retrieve the wheelchair 24 upon exiting the vehicle 12.

Figure 12:
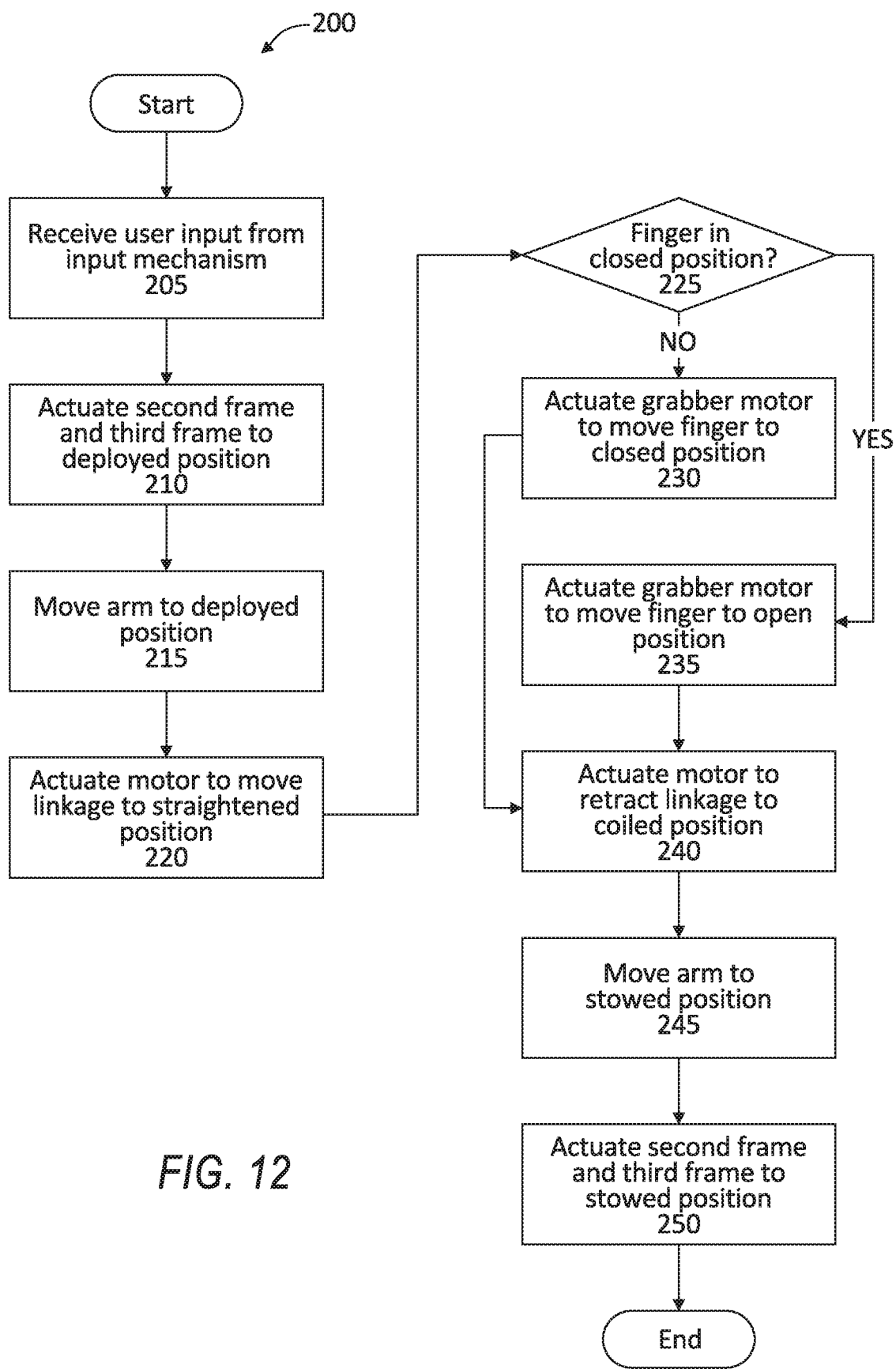
FIG. 12 is a block diagram of a process for moving the wheelchair into the vehicle.

FIG. 12 illustrates a process 200 for moving the wheelchair 24 into and out from the vehicle 12. The process 200 begins in a block 205, in which the controller 90 may receive the user input from the user mechanism. As described above, the user may provide the input to the user mechanism to indicate that the user intends to stow or retrieve the wheelchair 24.

Next, in a block 210, the controller 90 may actuate the second frame 48 and the third frame 50 to the deployed position. The second frame 48 and the third frame 50 may move out from the rear compartment 28 in the deployed position, as described above and shown in FIG. 2.

Figure 3A:
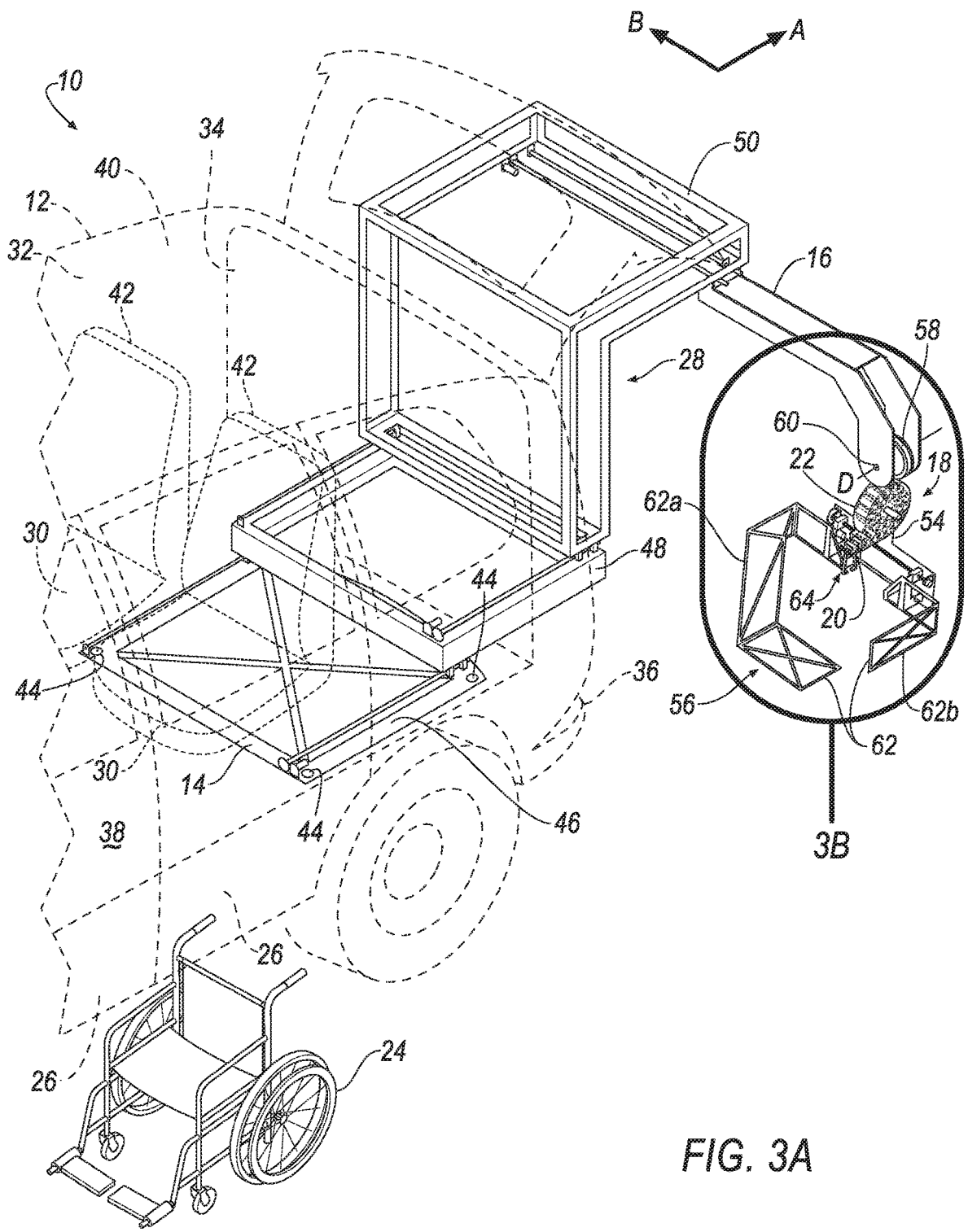
FIG. 3A is a perspective view of the wheelchair lift and an arm of the wheelchair lift in a deployed position.
Figure 3B:
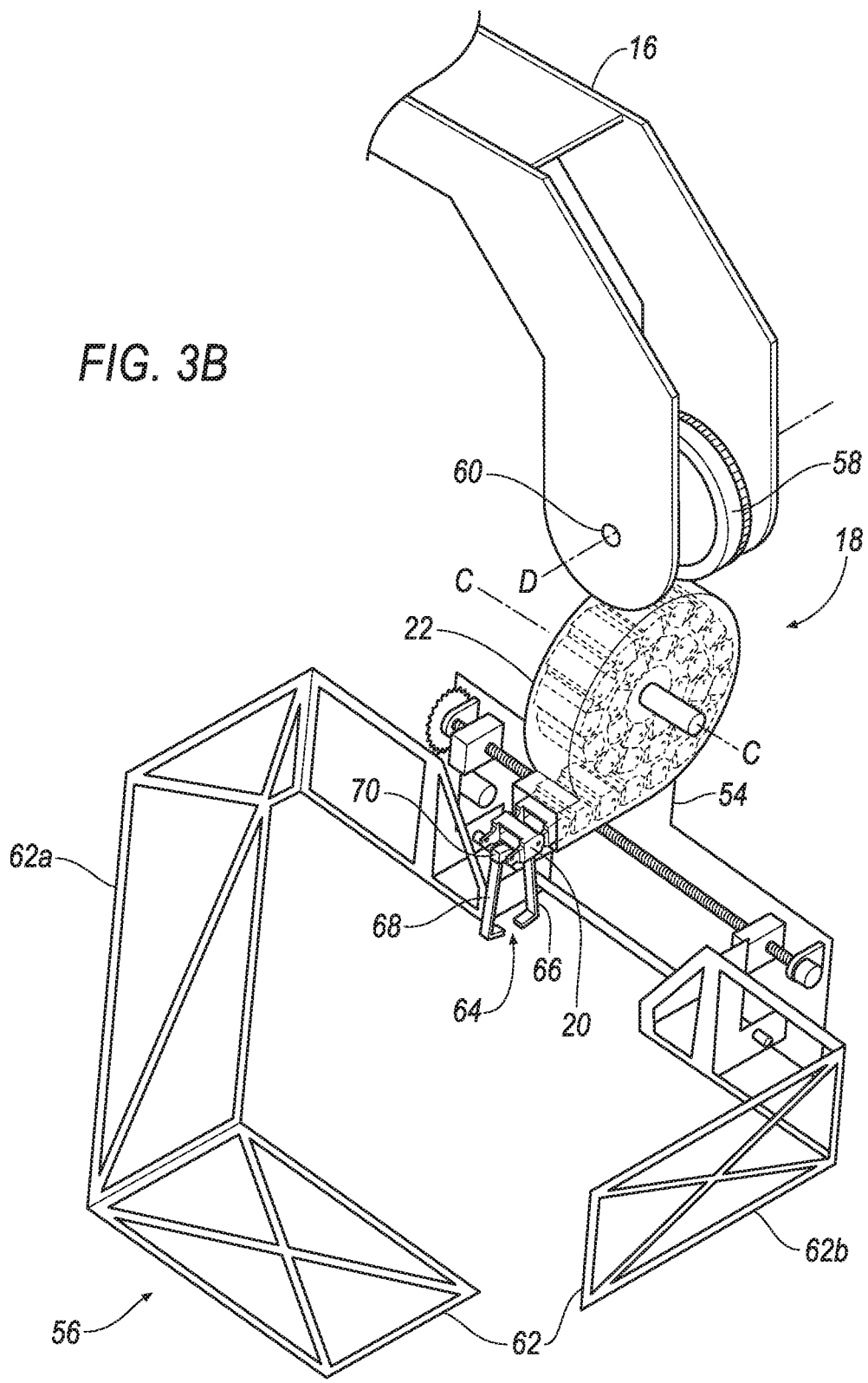
FIG. 3B is a magnified view of a chair support of the wheelchair lift.

Next, in a block 215, the controller 90 may move the arm 16 to the deployed position out of the rear compartment 28. When the arm 16 is in the deployed position, the arm 16 may be positioned to grab or deliver the wheelchair 24. For example, as shown in FIG. 3A, the arm 16 may be positioned to grab the wheelchair 24.

Next, in a block 220, the controller 90 may actuate the motor 22 to extend the linkage 20 toward the vehicle door 26 to the straightened position. In the straightened position, the linkage 20 may be positioned to grab or deliver the wheelchair 24. For example, as shown in FIG. 4, the linkage 20 may be positioned to grab the wheelchair 24.

Next, in a block 225, upon determining that the linkage 20 is in the straightened position, the controller 90 determines whether the finger 68 is in the open position or in the closed position. When the finger 68 is in the open position, the controller 90 may determine that wheelchair 24 is being taken from the user to be stowed and that the controller 90 may actuate the grabber 64 to grab the wheelchair 24. When the finger 68 is in the closed position, the controller 90 may determine that the wheelchair 24 is being delivered to the user and that the controller 90 may actuate the grabber 64 to release the wheelchair 24. If the controller 90 determines that the the finger 68 is in the closed position, the process 200 continues in a block 235. Otherwise, the process 200 continues in a block 230.

In the block 230, the controller 90 may actuate the grabber motor 70 to move the finger 68 to the closed position to grab the wheelchair 24. The controller 90 may actuate the grabber motor 70 to move the finger 68 toward the holder 66 to grab the wheelchair 24. The process 200 then proceeds in a block 240.

In the block 235, the controller 90 may actuate the grabber motor 70 to move the finger 68 to the open position to release the wheelchair 24. The controller 90 may actuate the grabber motor 70 to move the finger 68 away from the holder 66 to release the wheelchair 24. The process 200 then proceeds in the block 240.

Figure 5:
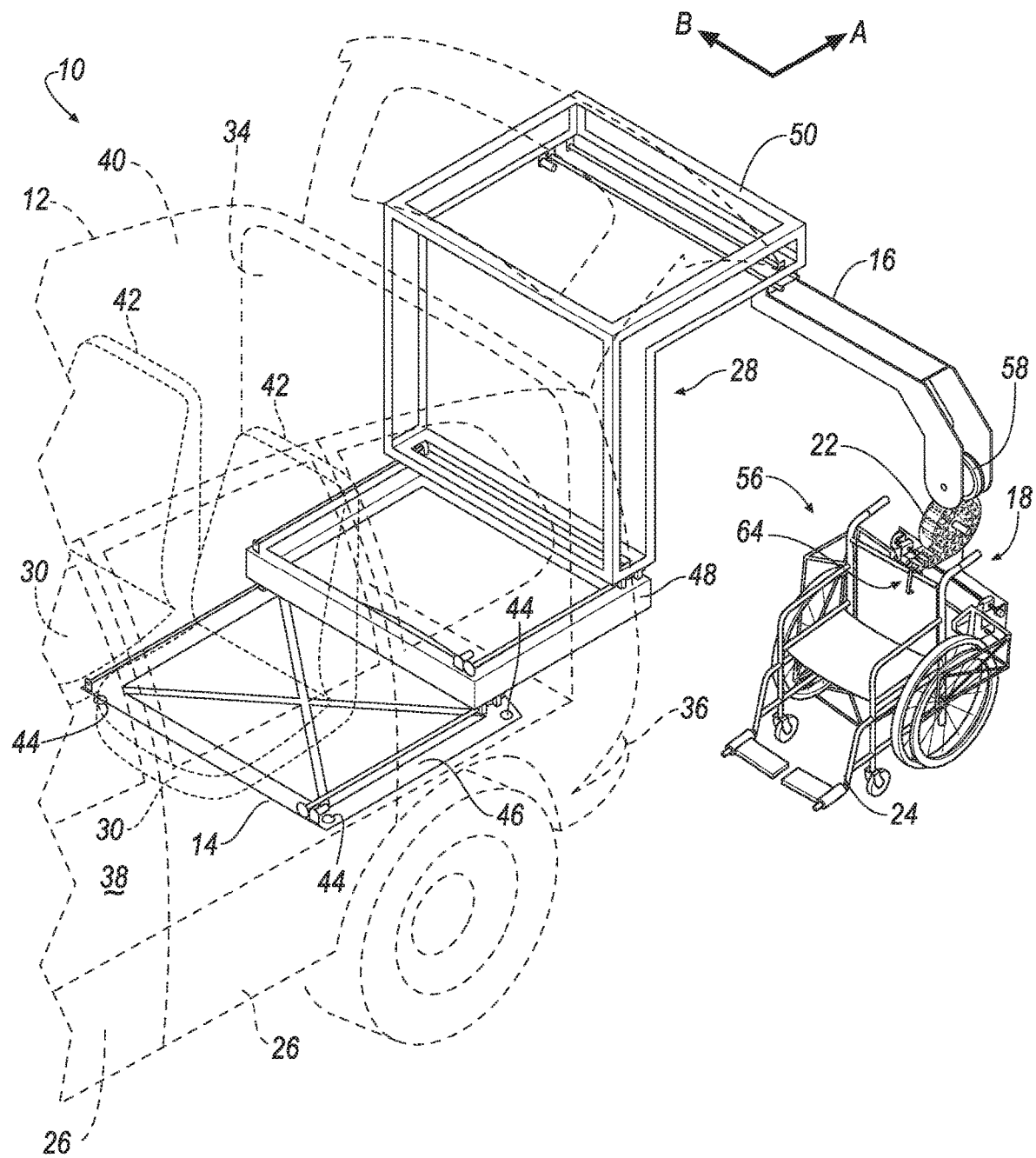
FIG. 5 is a perspective view of the linkage pulling a wheelchair to a chair support.
Figure 6:
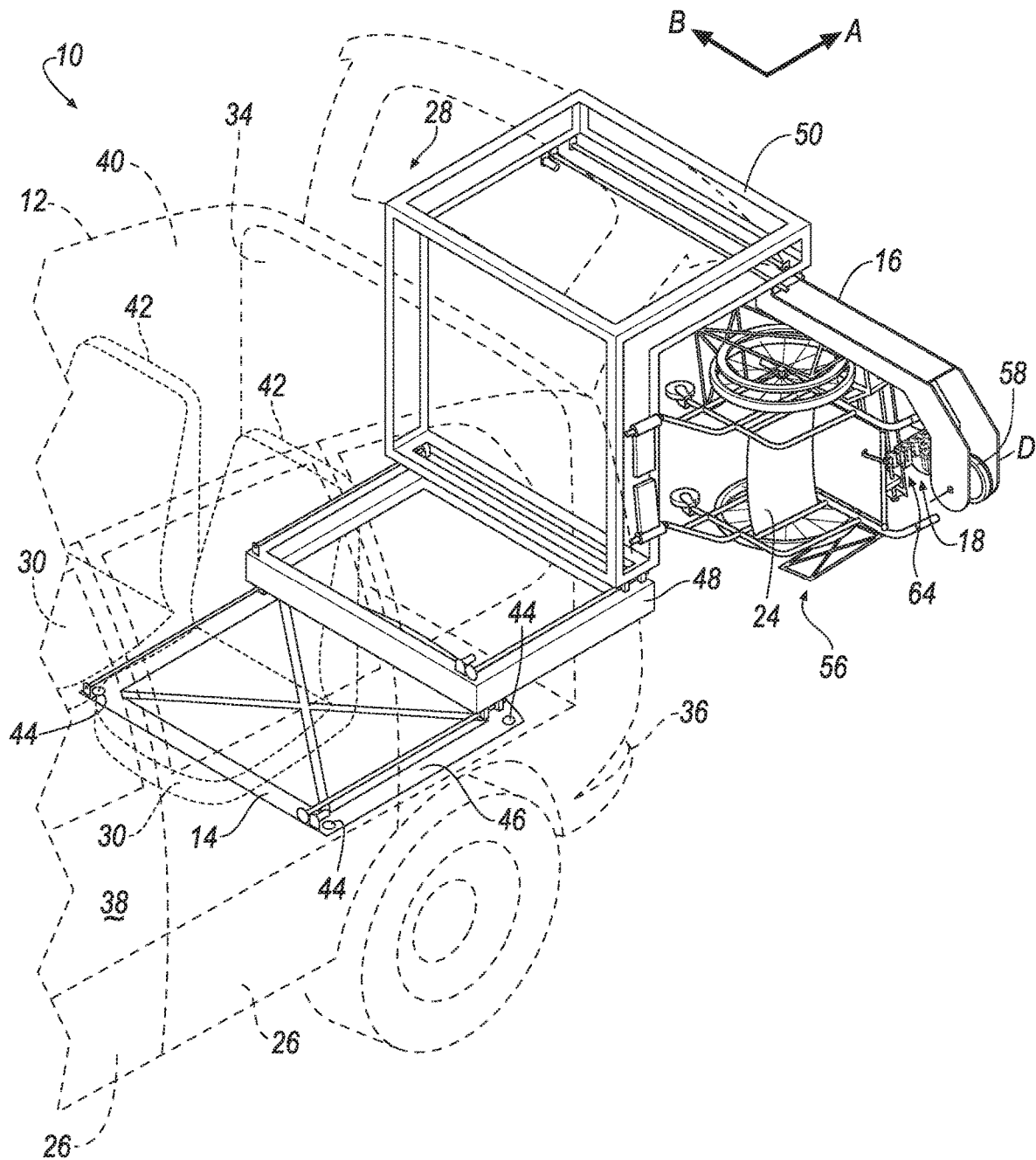
FIG. 6 is a perspective view of the arm rotating the chair support.

In the block 240, the controller 90 may actuate the motor 22 to retract the linkage 20 to the coiled position. For example, as shown in FIG. 5, upon grabbing the wheelchair 24, the motor 22 may retract the linkage 20 to the coiled position to move the wheelchair 24 into the mount 62. Alternatively, upon releasing the wheelchair 24, the motor 22 may retract the linkage 20 to the coiled position to stow the linkage 20.

Figure 7:
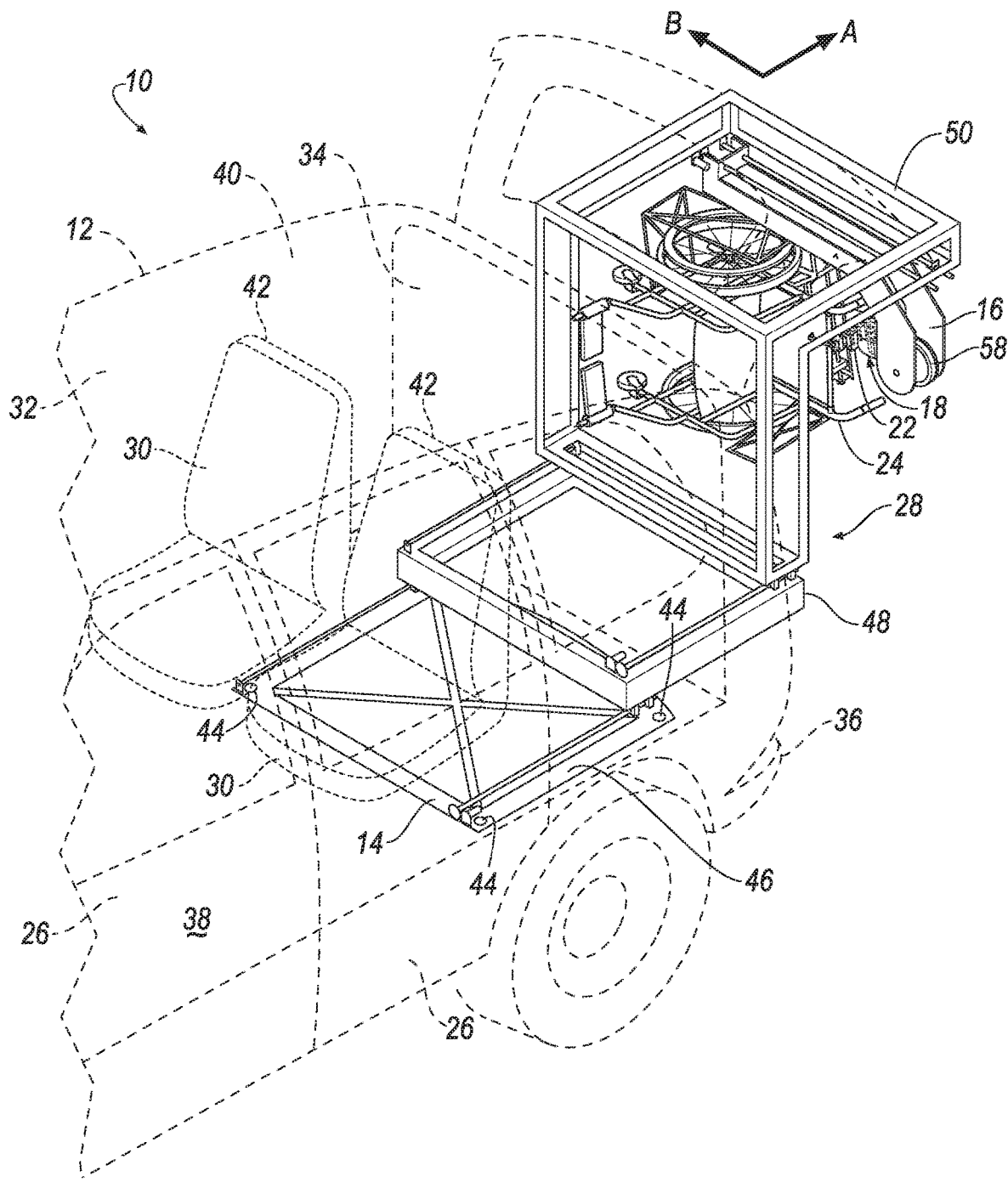
FIG. 7 is a perspective view of the arm moving to a stowed position with the wheelchair.

Next, in a block 245, the controller 90 may move the arm 16 to the stowed position. When the arm 16 is in the stowed position, the arm 16 may be positioned to stow the wheelchair 24. For example, as shown in FIG. 7, the arm 16 may support the wheelchair 24 prior to moving into the rear compartment 28.

Next, in a block 250, the controller 90 may actuate the second frame 48 and the third frame 50 to the stowed position. When the wheelchair lift 10 is stowing the wheelchair 24, as shown in FIG. 8, the second frame 48 and the third frame 50 may move the wheelchair 24 into the rear compartment 28. Following the block 250, the process 200 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A wheelchair lift, comprising:
a base;
an arm slideably supported by the base;
a chair support rotatably supported by the arm;
a linkage supported by the arm and extendable relative to the chair support from a coiled position to a straightened position, the linkage including a plurality of links; and
a motor supported by the arm and connected to the linkage, the linkage being coiled about the motor in the coiled position;
wherein, in the straightened position, at least two of the plurality of links extend substantially flat away from the motor.

2. The wheelchair lift of claim 1, wherein the linkage includes a proximity sensor and the arm is designed to stop extension of the linkage upon detection of an object with the proximity sensor.

3. The wheelchair lift of claim 1, wherein each link of the plurality of links includes a reacting surface and a lower surface, and in the straightened position, a lower surface of one of the plurality of links engages a reacting surface of an adjacent one of the plurality of links.

4. The wheelchair lift of claim 1, further comprising a grabber attached to the linkage, the grabber including a holder, a finger, and a second motor, wherein the finger is movable toward the holder with the second motor from an open position to a closed position and the linkage is connected to the holder.

5. The wheelchair lift of claim 4, wherein the finger is designed to engage a wheelchair.

6. The wheelchair lift of claim 1, wherein the base includes a first frame and a second frame movably connected to the first frame.

7. The wheelchair lift of claim 6, wherein the arm is supported by the second frame.

8. The wheelchair lift of claim 6, wherein the base includes a third frame movably connected to the second frame, wherein the arm is supported by the third frame.

9. The wheelchair lift of claim 1, wherein the chair support is positioned to grab a wheelchair and the arm includes an arm motor designed to rotate a grabber and the wheelchair about an axis defined by the arm motor.

10. The wheelchair lift of claim 1, wherein the base is translatable along a first direction and the arm is translatable along a second direction transverse to the first direction.

11. A vehicle, comprising:
a body extending along a longitudinal axis and defining an opening;
a vehicle floor supported by the body;
a base fixed to the vehicle floor;
an arm supported by the base movable out of the opening;
a chair support supported by the arm;
a linkage supported by the arm and extendable relative to the chair support from a coiled position to a straightened position, the linkage including a plurality of links; and
a motor supported by the arm and connected to the linkage, the linkage being coiled about the motor in the coiled position;
wherein, in the straightened position, at least two of the plurality of links extend substantially flat away from the motor.

12. The vehicle of claim 11, further comprising a seat, wherein the base is movable to a stowed position below a top of the seat.

13. The vehicle of claim 11, wherein the chair support is positioned to engage a wheelchair and the arm includes an arm motor designed to rotate the chair support and the wheelchair about the longitudinal axis.

14. The vehicle of claim 11, further comprising a door attached to the body and a wheelchair spaced from the door and the body, wherein the chair support is positioned to grab the wheelchair and to move the wheelchair into the body through the opening.

15. The vehicle of claim 11, further comprising a grabber attached to the linkage, the grabber including a holder, a finger, and a second motor, wherein the finger is movable toward the holder with the second motor from an open position to a closed position and the linkage is connected to the holder.

16. The vehicle of claim 11, wherein the base includes a first frame and a second frame movably connected to the first frame.

17. The vehicle of claim 16, wherein the second frame is translatable along the longitudinal axis and the arm is translatable along a cross-vehicle axis transverse to the longitudinal axis.

18. A system, comprising a computer programmed to:
upon receiving a user input, move an arm out from a rear compartment of a vehicle;
actuate a motor on the arm to extend a linkage toward a vehicle door to a straightened position; and
actuate the motor to retract the linkage away from the vehicle door to a coiled position; the linkage being coiled about the motor in the coiled position;
wherein the linkage includes a plurality of links, and in the straightened position, at least two of the plurality of links extend substantially flat away from the motor.

19. The system of claim 18, wherein the computer is further programmed to, upon extending the linkage to the straightened position, actuate a grabber motor to move a finger toward a holder to grab a wheelchair.

20. The system of claim 18, wherein the computer is further programmed to, upon extending the linkage to the straightened position, actuate a grabber motor to move a finger away from a holder to release a wheelchair.

* * * * *